(12) United States Patent
Freitag

(10) Patent No.: US 12,174,152 B2
(45) Date of Patent: Dec. 24, 2024

(54) CONTROLLED ENVIRONMENT COMPOSITE TESTING SYSTEM

(71) Applicant: Bell Textron Inc., Fort Worth, TX (US)

(72) Inventor: Corbin Tod Freitag, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 769 days.

(21) Appl. No.: 17/112,879

(22) Filed: Dec. 4, 2020

(65) Prior Publication Data

US 2022/0178801 A1 Jun. 9, 2022

(51) Int. Cl.
*G01N 3/08* (2006.01)

(52) U.S. Cl.
CPC ....... *G01N 3/08* (2013.01); *G01N 2203/0017* (2013.01); *G01N 2203/0222* (2013.01); *G01N 2203/0236* (2013.01); *G01N 2203/04* (2013.01)

(58) Field of Classification Search
CPC ............ G01N 3/08; G01N 2203/0222; G01N 2203/0236; G01N 2203/04; G01N 2203/0017

See application file for complete search history.

(56) References Cited

U.S. PATENT DOCUMENTS

| | | | | |
|---|---|---|---|---|
| 2,660,881 A | * | 12/1953 | Van Degrift | G01N 3/18 73/826 |
| 5,095,757 A | * | 3/1992 | Larsen | G01N 3/04 73/857 |
| 10,101,251 B2 | * | 10/2018 | Mourad | G01N 3/02 |
| 11,460,386 B2 | * | 10/2022 | Algarni | H05B 6/10 |
| 11,714,035 B2 | * | 8/2023 | Li | G01N 1/44 73/587 |
| 2009/0314107 A1 | * | 12/2009 | Yakimoski | G01N 3/08 73/865.6 |
| 2014/0123773 A1 | * | 5/2014 | Lemmer | G01N 3/04 73/864.91 |
| 2017/0138827 A1 | * | 5/2017 | Mourad | G01N 3/02 |
| 2020/0300739 A1 | * | 9/2020 | Algarni | H05B 3/283 |
| 2023/0204481 A1 | * | 6/2023 | Li | G01N 29/14 73/587 |

FOREIGN PATENT DOCUMENTS

| | | | | | |
|---|---|---|---|---|---|
| CN | 103673187 A | * | 3/2014 | | |
| CN | 103776702 A | * | 5/2014 | | |
| CN | 105954131 A | * | 9/2016 | ............ | G01N 3/068 |
| CN | 108844883 A | * | 11/2018 | ........... | G01N 17/002 |
| DE | 102011055947 A1 | * | 6/2013 | ............... | G01N 3/08 |

* cited by examiner

*Primary Examiner* — Jonathan M Dunlap
(74) *Attorney, Agent, or Firm* — Lightfoot & Alford PLLC

(57) ABSTRACT

A test apparatus includes a first grip, a second grip movable relative to the first grip, a test specimen disposed to provide a load path between the first grip and the second grip, and a test chamber disposed to both substantially envelope the test specimen and move with one of the first grip and the second grip. The test chamber does not contact the test specimen. Another test apparatus includes, a first grip, a second grip movable relative to the first grip, a test specimen disposed to provide a load path between the first grip and the second grip, a first test chamber disposed to both substantially envelope the test specimen and move with one of the first grip and the second grip, and a second test chamber disposed to both substantially envelope both the test specimen and the first test chamber.

10 Claims, 7 Drawing Sheets

CONTROLLED ENVIRONMENT COMPOSITE TESTING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditionally, mechanical testing of composite specimens using testing machines such as tensile testing machines, rotary fatigue life machines, and the like, conduct such testing in an open ambient environment so that the composite specimen is generally maintained at an ambient temperature and an ambient humidity. In cases where composites are to be utilized under specific temperature and/or humidity conditions in the field, it can be helpful to mechanically test composite specimens under similar temperatures and/or humidities. Accordingly, some mechanical testing systems have included test chambers in which the test specimens are disposed during testing. The environment within the test chambers can be controlled to provide a desired temperature and/or humidity. However, the test chambers configured for controlling a humidity and/or wetness, are typically in contact with and/or sealed relative to the composite specimen itself.

BRIEF DESCRIPTION OF THE DRAWINGS

For a more complete understanding of the present disclosure and the advantages thereof, reference is now made to the following brief description, taken in connection with the accompanying drawings and detailed description.

Prior Art FIG. 1. is a partial front view of a conventional test apparatus.

DETAILED DESCRIPTION

This disclosure divulges systems and methods for mechanically testing a composite specimen in a temperature and/or humidity controlled chamber without contacting the composite specimen.

Figure 1:
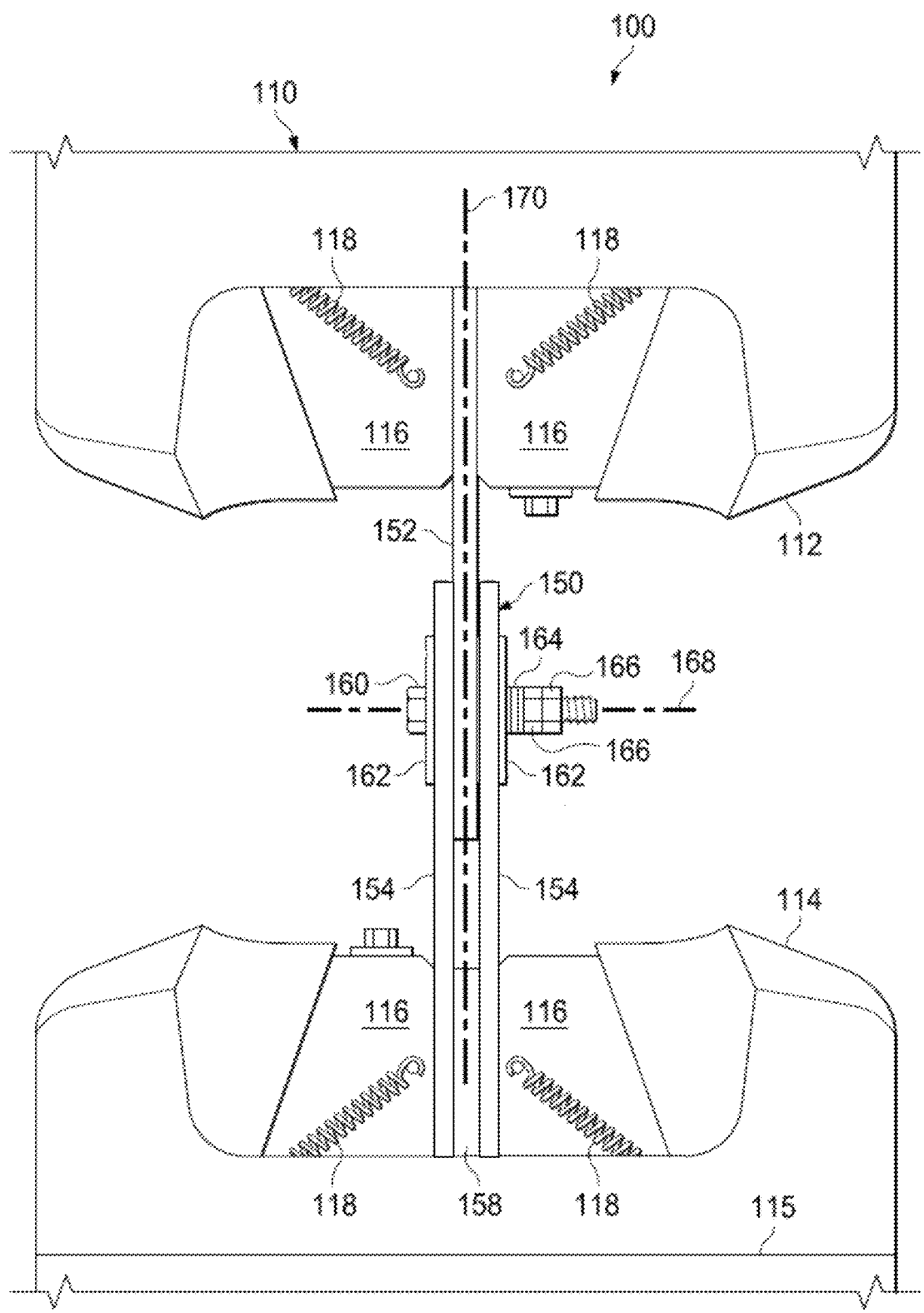

Referring now to Prior Art FIG. 1, a partial front view of a test apparatus 100 is shown according to an embodiment of the disclosure. The test apparatus 100 generally comprises a test machine 110 and a test assembly 150. The test machine 110 generally comprises a tensile testing machine that comprises an upper grip 112 and a lower grip 114. However, in other embodiments, the test machine 110 may comprise alternative-type test machine comprising a selectively movable member 115 configured to apply an axial displacement, bending moment, and/or torsional rotation to the lower grip 114 and/or the test assembly 150 to further determine wear and/or anti-fretting properties caused by such axial displacement, bending moment, and/or torsional rotation. Each of the grips 112, 114 comprises a pair of jaws 116 for applying pressure to and securely retaining at least a portion of the test assembly 150 during testing between adjacent jaws 116 of each of the upper grip 112 and the lower grip 114. Further, in some embodiments, each of the jaws 116 of the test machine 110 may also comprise a spring 118 which may prevent the jaws 116 from tightening during testing. However, in some embodiments, the springs 118 may retain the jaws 116 in an open position during insertion of a portion of the test assembly 150 into the jaws 116 and/or assembly of the test apparatus 100.

The test assembly 150 generally comprises a test specimen 152 and two outer plates 154 that are assembled in a so-called "lug and clevis" style joint, where the test specimen 152 is disposed between the two, adjacently-disposed parallel outer plates 154. In this embodiment, the test specimen is a composite specimen. However, in other embodiments, the test specimen 152 may be formed of metal or any other material suitable for mechanical testing. The outer plates 154 are generally formed from either a 17-4PH stainless steel or 15-5PH stainless steel. However, in other embodiments, the outer plates 154 may be formed from any other suitable material.

The test assembly 150 also comprises a support plate 158. The support plate 158 may generally be formed from a metallic material and is disposed between the outer plates 154 at an end of the outer plates 154 that interfaces with the jaws 116 of the lower grip 114. The support plate 158 is configured to function as a spacer that allows the jaws 116 of the lower grip 114 to tightly secure the outer plates 154 without substantially deforming and/or collapsing the outer plates 154 inward to maintain the proper geometry between the test specimen 152 and the outer plates 154.

The test assembly 150 also comprises a bolt 160, two outer washers 162 each associated with an outer plate 154, a plurality of smaller washers 164, and two nuts 166 that function as the securing means for the test assembly 150. The bolt 160 can be selected based on the diameter, thread count (threads per inch), thread pitch (metric), and/or strength of the bolt 160 to ensure the required compressive preload is applied to the joint during testing. Additionally, it will be appreciated that the number and/or size of the washers 162, 164 may be selected to provide an equal load distribution to the outer plates 154. Thus, in some embodiments, the test assembly 150 may omit one or more of the outer washers 162 and/or one or more of the plurality of smaller washers 164. In some embodiments, the test assembly 150 may only comprise one nut 166. As will be discussed later herein, the number of outer washers 162, smaller washers 164, and nuts 166 used in the test assembly 150 may be selectively altered to allow the test assembly 150 to achieve the proper preload in the joint for testing.

When the test assembly 150 is assembled, the bolt 160 and at least one nut 166 may be used to clamp the test assembly 150 together. The bolt 160 may be inserted through axially-aligned holes 155 in each of the support plates, an axially-slotted hole 153 in the test specimen 152, the outer washers 162, and any smaller washers 164 used in the test assembly 150. As such, the bolt 160 may function to align each of the components of the test assembly 150 clamped together by the bolt 160 and nut 166 along axis 168. Furthermore, to simulate the proper preload in the joint for testing, the bolt 160 and/or the nut 166 may be torqued to a value required to develop the necessary contact pressure. Still further, it will be appreciated that the addition of an outer, secondary nut 166 may be employed to ensure the proper preload is maintained and prevent a primary, inner nut 166 from backing off and/or loosening along the bolt 160.

In operation, the test specimen 152 is secured by the jaws 116 of the upper grip 112 of the test machine 110, while the outer plates 154 are secured by the jaws 116 of the lower grip 114 of the test machine 110. Alternatively, however, the orientation of the test assembly 150 may be reversed such that the test specimen 152 is secured by the jaws 116 of the lower grip 114, while the outer plates 154 are secured by the jaws 116 of the upper grip 112. One of the grips 112, 114 may remain stationary with respect to the remainder of the test machine 110 while the other grip 112, 114 may move along a longitudinal axis 170. In this embodiment, the upper grip 112 remains stationary, while the lower grip 114 moves along the longitudinal axis 170.

By moving the lower grip 114 longitudinally along axis 170, the test machine 110 controls relative motion between the test specimen 152 and the outer plates 154. The test machine 110 may be programmed to apply a predetermined total axial displacement along axis 170 and/or to apply a predetermined frequency of displacement cycles as the lower grip 114 oscillates along axis 170. The motion imparted by the test machine 110 can be caused to simulate vibrations anticipated in field use of the composite device represented by the composite test specimen 152. Accordingly, the test apparatus 100 is configured to simulate loads, linear and rotational motions, motion frequencies, and material combinations. Furthermore, it will be appreciated that in some embodiments, test machine 110 may be configured to apply an axial displacement, bending moment, and/or torsional rotation to the test assembly 150. Test apparatus 100 is limited to conducting testing of the test specimen 152 while the test specimen is exposed to the ambient temperature and/or humidity in which the entirety of the test apparatus 100 is disposed, namely, the temperature and/or humidity of a testing room.

Figure 2:
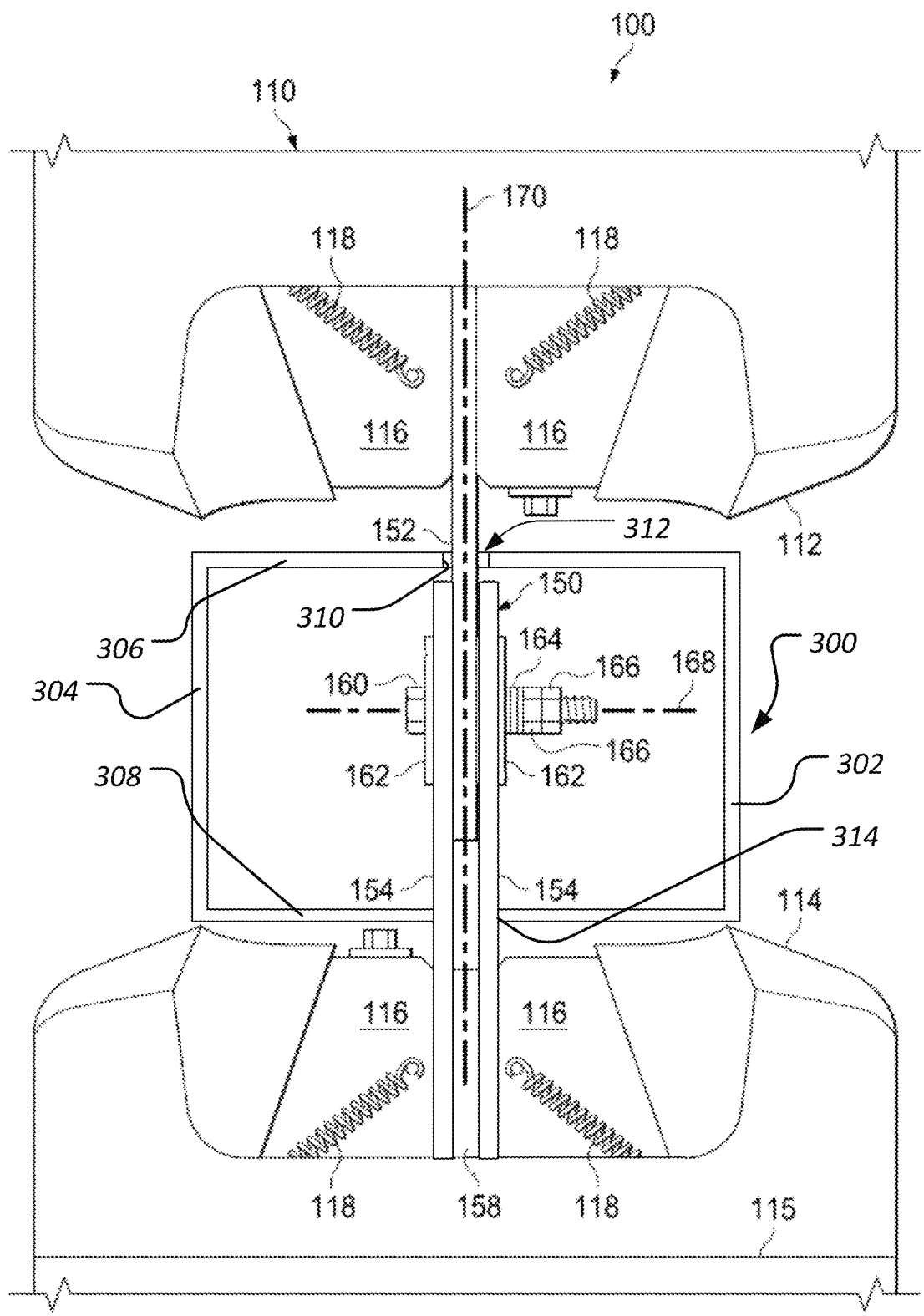
FIG. 2 is a partial front view of a conventional test apparatus according to an embodiment of the disclosure.
Figure 3:
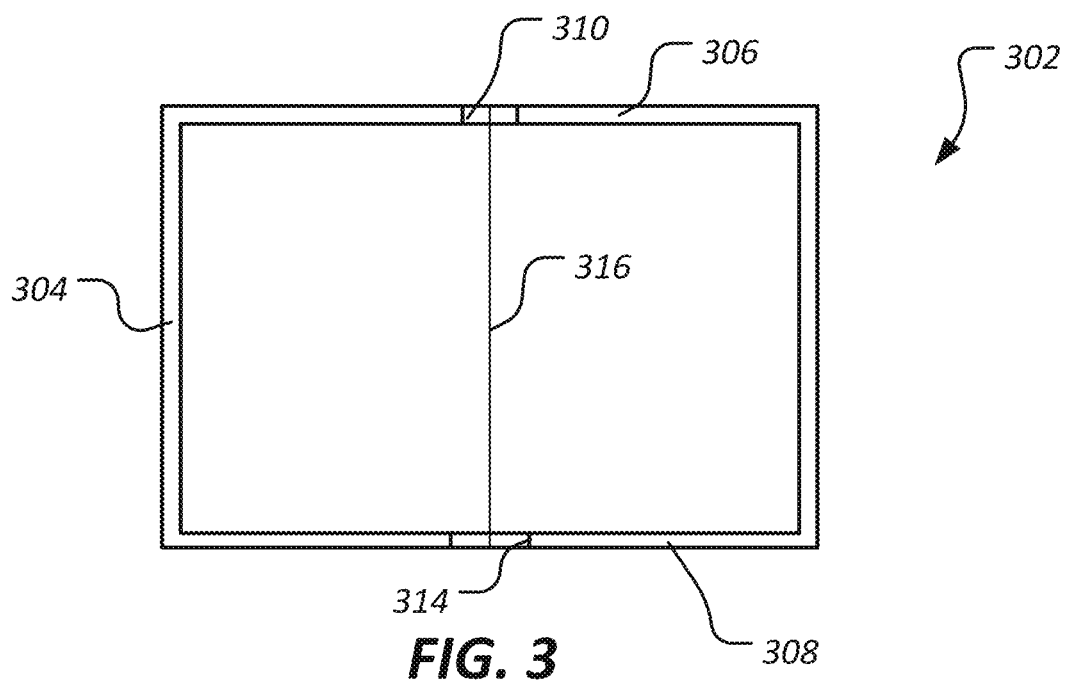
FIG. 3 is a partial schematic side view of a test chamber of the test apparatus of FIG. 2.
Figure 4:
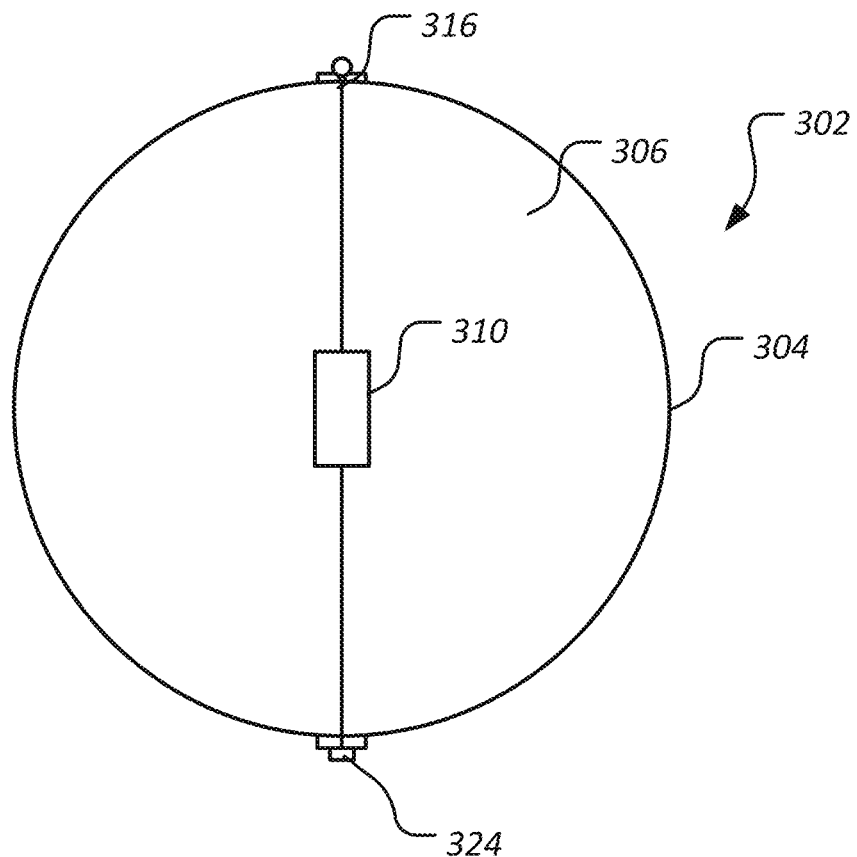
FIG. 4 is a top view of the test chamber of FIG. 3.
Figure 5:
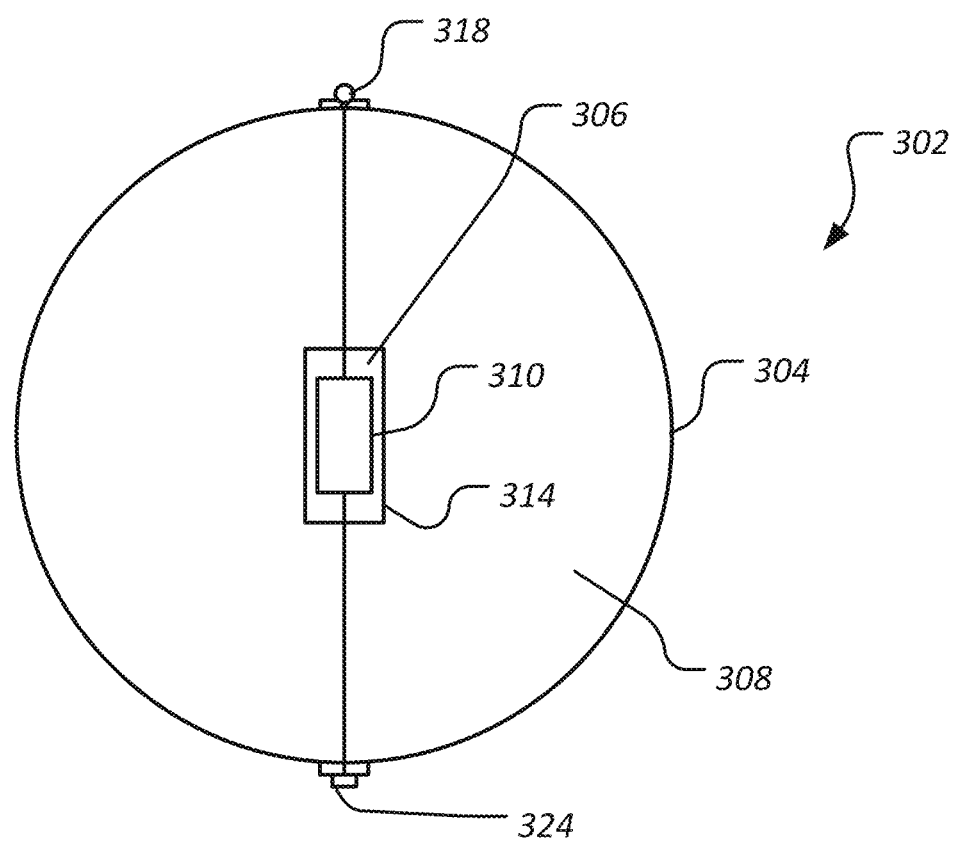
FIG. 5 is a bottom view of the test chamber of FIG. 3 in a closed configuration.
Figure 6:
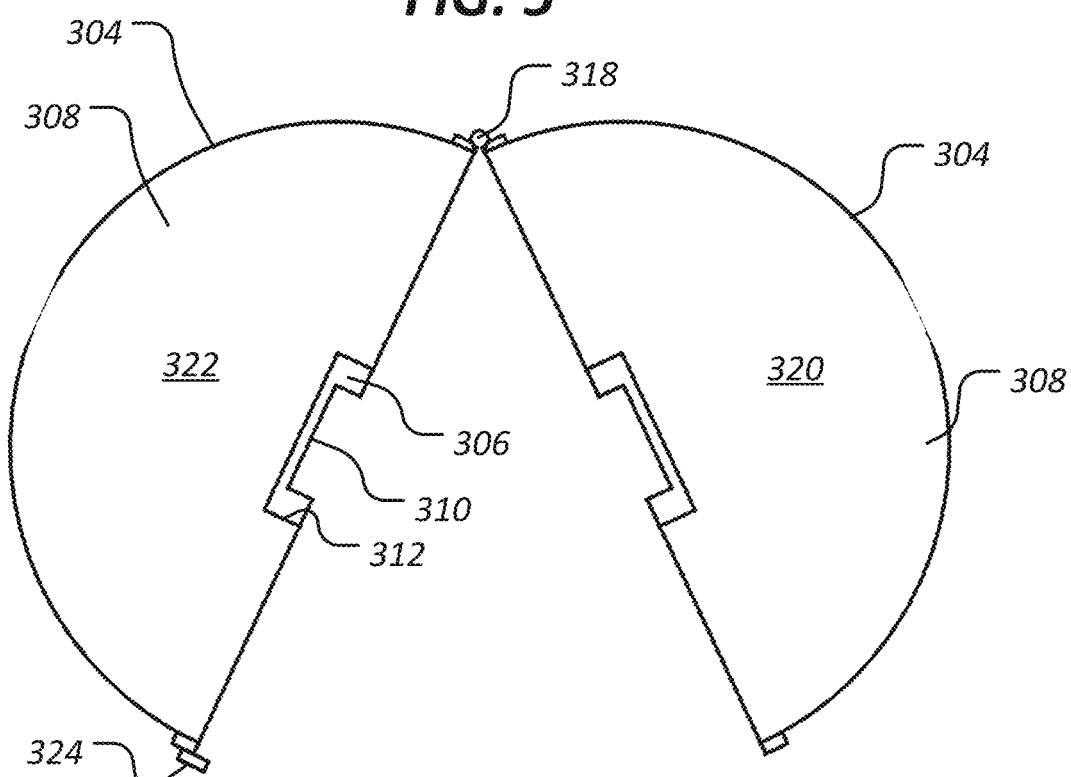
FIG. 6 is a bottom view of the test chamber of FIG. 3 in an open configuration.

Referring now to FIG. 2, a portion of a test apparatus 200 according to an embodiment of this disclosure is shown. Test apparatus 200 is substantially similar to test apparatus 100 but further comprises an environment control system (ECS) 300. ECS 300 is provided and configured to expose the test specimen 152 to a different temperature and/or humidity as compared to the temperature and/or humidity of the ambient environment in which the entirety of test apparatus 200 is disposed. In other words, ECS 300 can maintain a desired temperature and/or humidity in the immediate surroundings about the test specimen 152 and the desired temperature and/or humidity can be different than the ambient environment. As shown, ECS 300 can comprise a test chamber 302 that substantially envelopes test specimen 152 without directly contacting test specimen 152. In this embodiment, test chamber 302 generally comprises a cylindrical outer wall 304 with an upper cap 306 and a lower cap 308. The upper cap 306 comprises a specimen aperture 310 configured to allow test specimen 152 to extend therethrough without contacting upper cap 310 and providing a gap 312 therebetween. The lower cap 308 comprises a mount aperture 314 configured to selectively sealingly engage outer plates 154. In some cases, test chamber 302 can be carried by one or more of outer plates 154. In this embodiment, test chamber 302 is provided in two portions that are movably joined together and selectively fixed relative to each other (as shown in FIGS. 3-6).

Referring now to FIG. 3-6, test chamber 302 is shown in greater detail. It is shown that specimen aperture 310 and mount aperture 314 can comprise different sizes. Further, it is shown that test chamber 302 comprises an internal hinge line 316. On one side of the test chamber 302, a longitudinal hinge 318 connects a first portion 320 and a second portion 322 of the test chamber 302. On an opposing side of the test chamber 302, a closure device 324 is provided to selectively retain the test chamber 302 in a closed configuration. In some cases, portions of closure device 324 may be distributed on both the first portion 320 and the second portion 322.

Figure 7:
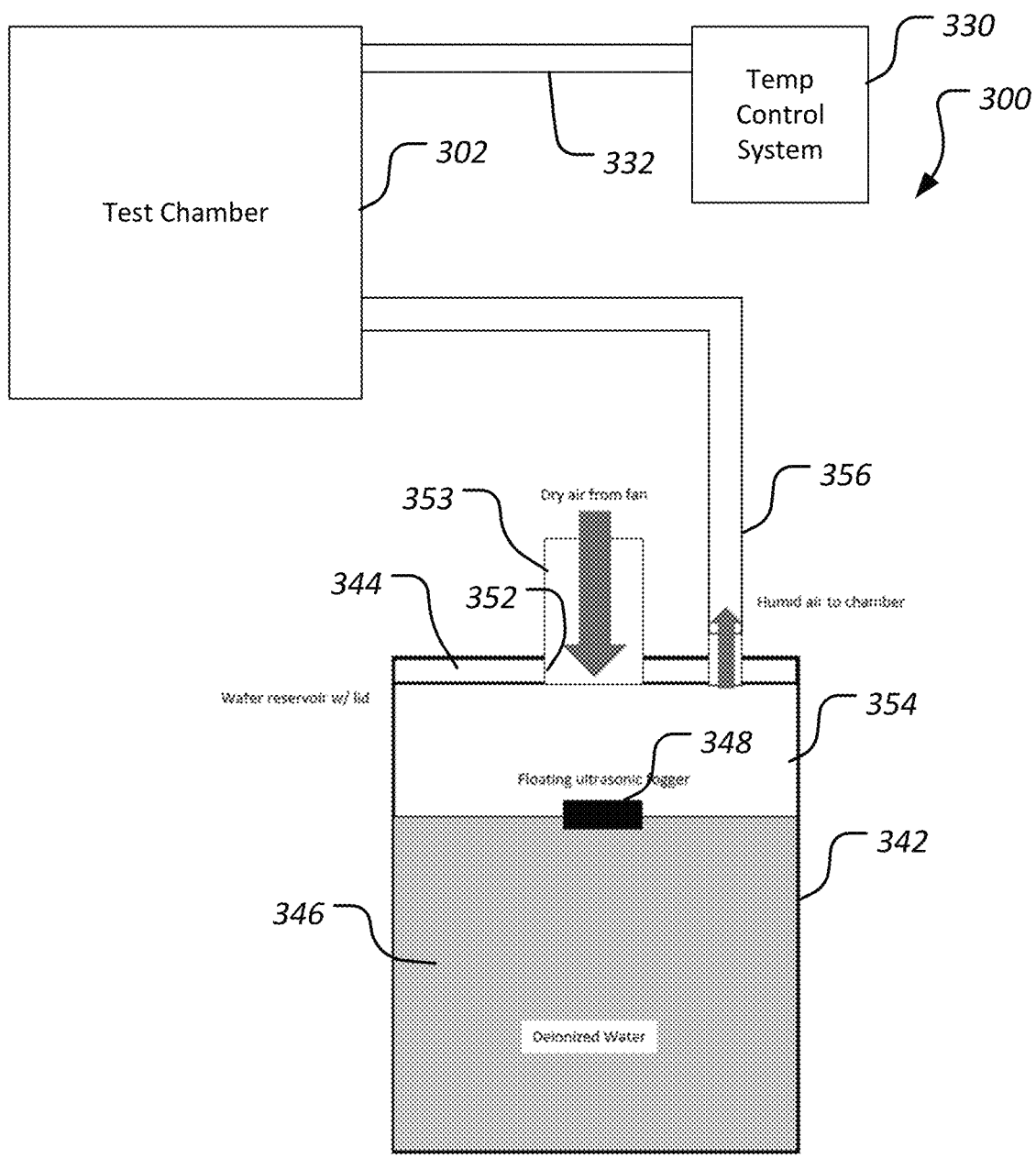
FIG. 7 is a partial schematic view of the test apparatus of FIG. 2.

Referring now to FIG. 7, a schematic view of a portion of ECS 300 is shown. In this embodiment, ECS 300 further comprises a temperature control system 330 that comprises one or more of an electrically resistive heater, heat sensors, and/or controllers for managing a desired temperature within test chamber 302. In cases where the resistive heater is not located within test chamber 302, a fan can be utilized to push heated air through heater conduit 332 into test chamber 302 through a heat aperture formed in test chamber 302. In some cases, a temperature sensor and/or an electrically resistive heater can be located within test chamber 302.

ECS 300 further comprises a humidity control system 340. Humidity control system comprises a liquid reservoir 342, a lid 344 for substantially sealing reservoir 342, deionized water 346, and a floating ultrasonic fogging device 348. The fogging device 348 is configured to generate fog 350 within reservoir 342. A fan is further provided to push dry ambient air into the reservoir through lid aperture 352 and dry air conduit 353 so that fogged air 354 can be pushed into test chamber 302 via fog conduit 356 that extends between an aperture of the lid 344 and a fog aperture formed in chamber 302. With the test chamber 302 substantially enveloping test specimen 152, ECS 300 can be controlled manually and/or electronically to effectuate desired temperatures and/or humidities within test chamber 302.

Figure 8:
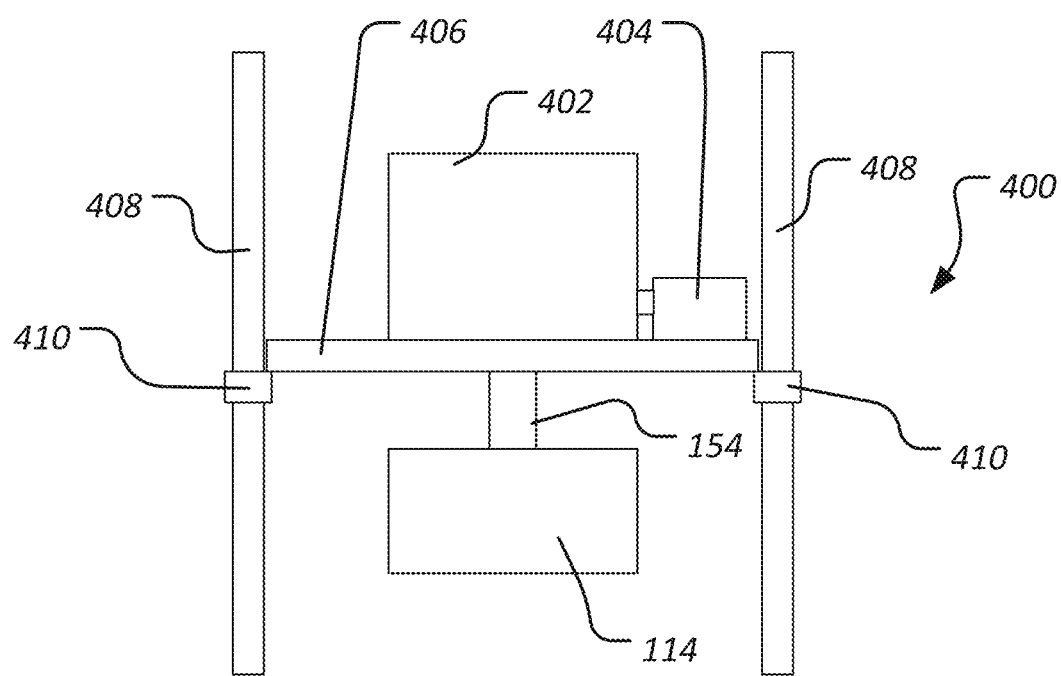
FIG. 8 is a partial schematic front view of a test apparatus according to another embodiment of the disclosure in a first position.
Figure 9:
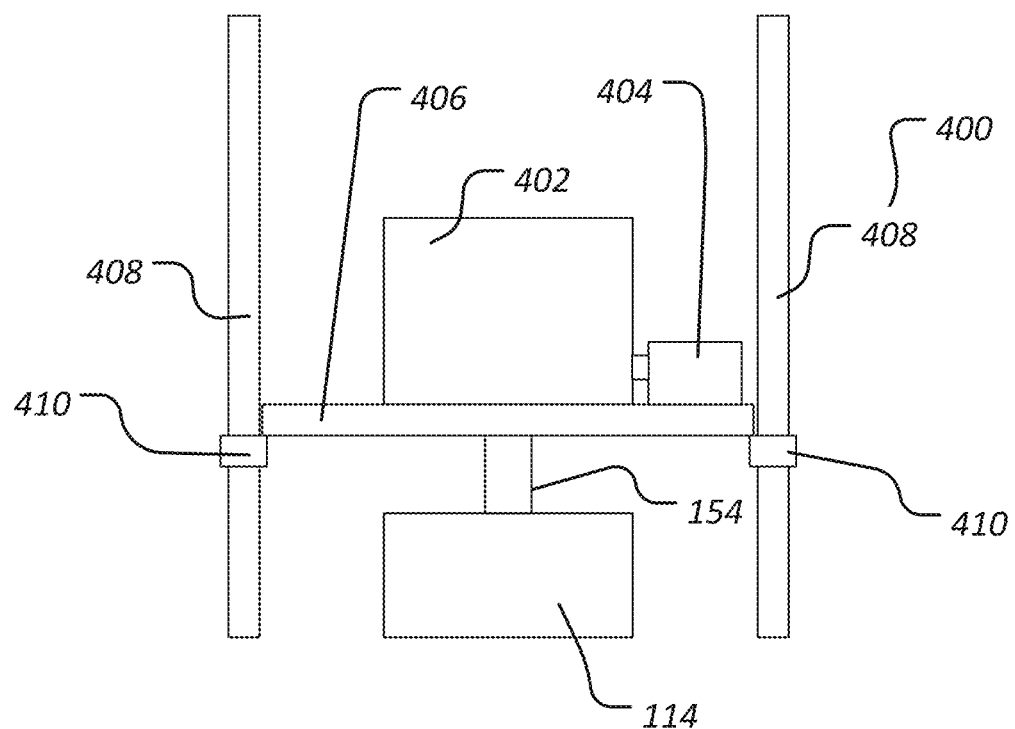
FIG. 9 is a partial schematic front view of the test apparatus of FIG. 8 in a second position.

Referring now to FIGS. 8 and 9, a portion of an alternative embodiment of a test apparatus 400 is shown. Test apparatus 400 is similar to test apparatus 200 at least in that it comprises a test chamber 402 and a temperature and/or humidity control system 404 that is configured to control a temperature and/or humidity within test chamber 402. However, in this embodiment the test chamber 402 and temperature and/or humidity control system 404 are carried by a crossbar 406 rather than being carried by outer plates 154. Crossbar 406 is free to move longitudinally along rails 408 using support bearings 410. FIG. 8 shows the test chamber 402 at a relatively higher position as compared to the position of test chamber in FIG. 9.

Figure 10:
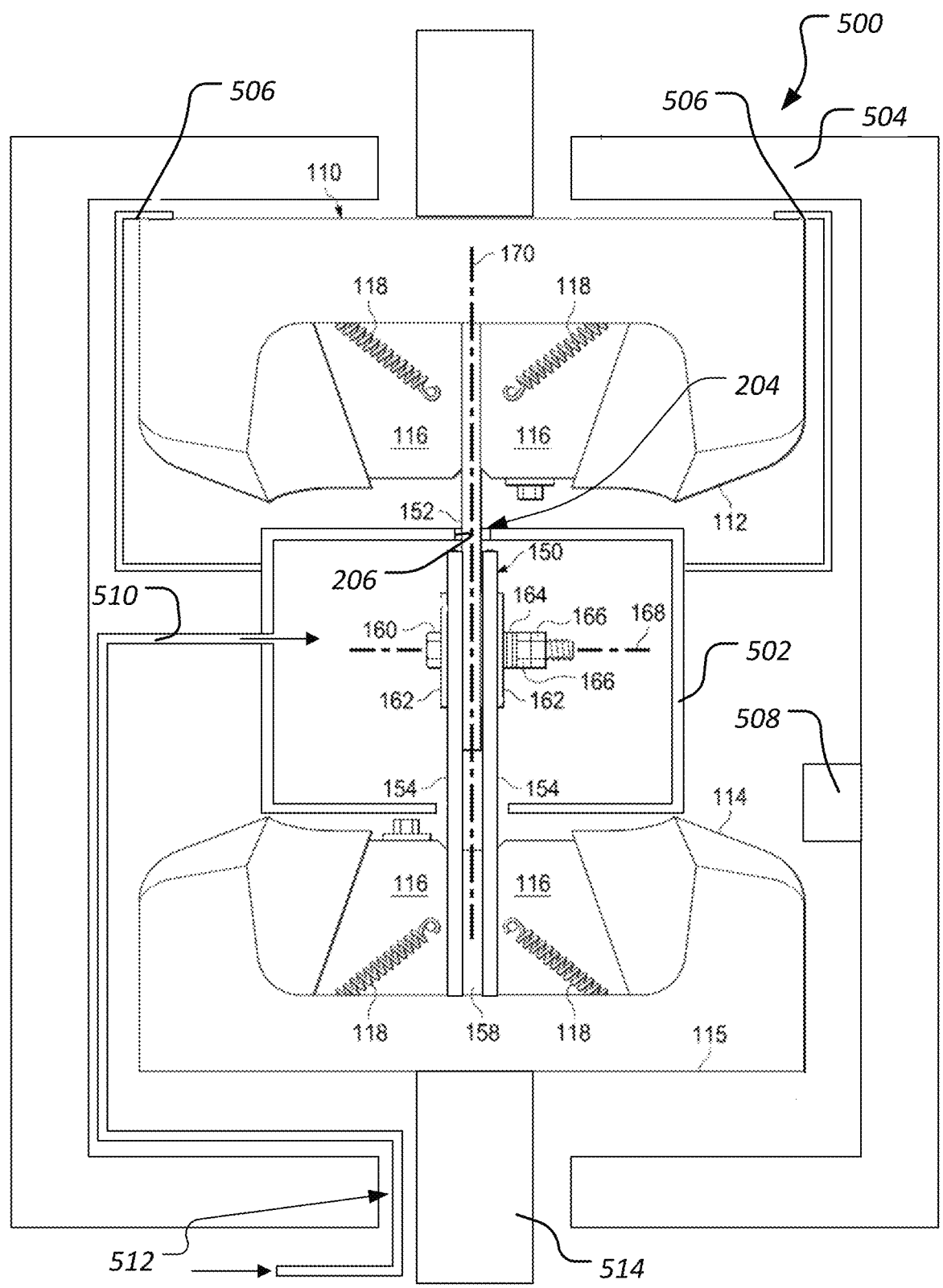
FIG. 10 is a partial schematic front view of another embodiment of a test apparatus according to the disclosure.

Referring now to FIG. 10, a portion of an alternative embodiment of a test apparatus 500 is shown. Test apparatus 500 is substantially similar to test apparatus 200, but the test chamber 502 is relegated to controlling humidity and/or wetness while another larger test chamber 504 substantially envelopes test chamber 502 and control temperature within test chamber 504. Accordingly, substantially similar temperature and/or humidity control of the environment immediately surrounding test specimen 152 is controlled, although the test chambers are provided in a nested manner. In this embodiment, test chamber 504 is independently vertically supported and does not move relative to the remainder of the test apparatus 500. Accordingly, the test specimen 152 and test chamber 502 can be moved within test chamber 504. Another difference between test apparatus 500 and test apparatus 200 is that test chamber 502 is not carried by outer plates 154, but rather, is suspended from upper grip 112 using hanger arms 506. Further, at least a heat generation device 508 and/or a heat sensor is disposed within test chamber 504. Finally, a fog conduit 510 is configured to pass into test chamber 504 via a gap 512 between test chamber 504 vertical support 514 that moves and/or supports lower grip 114 and is terminated at an aperture of test chamber 502 to deliver fogged air into test chamber 502. It will be appreciated that neither the test chamber 502 nor the test chamber 504 contact specimen 152.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A test apparatus, comprising:
    a first grip;
    a second grip movable relative to the first grip;
    a test specimen disposed to provide a load path between the first grip and the second grip; and
    a first test chamber disposed to both substantially envelope the test specimen and move with one of the first grip and the second grip, wherein the first test chamber does not contact the test specimen; and
    a second test chamber disposed to substantially envelope both the test specimen and the first test chamber, wherein the second test chamber does not contact the test specimen;
    wherein the second test chamber is moved with at least one of the first grip and the second grip.

2. The test apparatus of claim 1, wherein the test specimen comprises a composite material.

3. The test apparatus of claim 1, further comprising:
    a temperature control system configured to control a temperature within at least one of the first test chamber and the second test chamber.

4. The test apparatus of claim 1, further comprising:
    a humidity control system configured to control a humidity within at least one of the first test chamber and the second test chamber.

5. The test apparatus of claim 4, wherein the humidity control system comprises a floating fogger device.

6. The test apparatus of claim 4, wherein the temperature control system comprises an electrically resistive heat element.

7. The test apparatus of claim 4, wherein a portion of at least one of the temperature control system and the humidity control system is disposed within the first test chamber.

8. The test apparatus of claim 4, wherein a portion of at least one of the temperature control system and the humidity control system is disposed within the second test chamber.

9. The test apparatus of claim 4, wherein a portion of at least one of the temperature control system and the humidity control system is moved with one of the first grip and the second grip.

10. The test apparatus of claim 1, wherein the second test chamber is substantially stationary while at least one of the first grip and the second grip move.

\* \* \* \* \*